No. 740,925. PATENTED OCT. 6, 1903.
F. A. RICHTER.
STAR WHEEL FOR MUSIC BOXES.
APPLICATION FILED MAY 29, 1902.
NO MODEL.
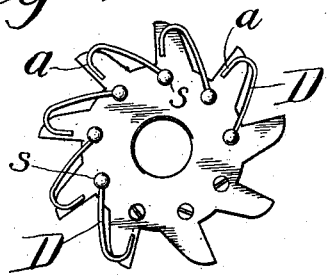
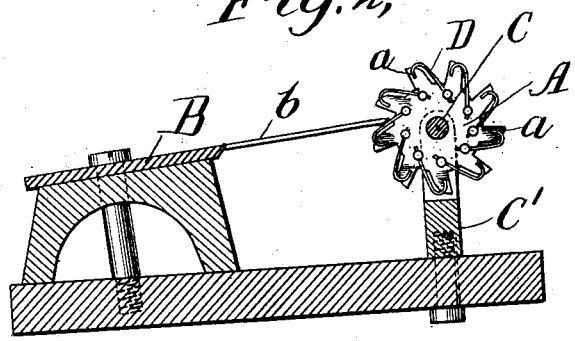
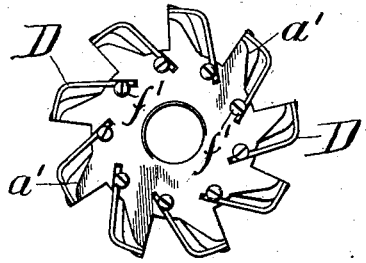
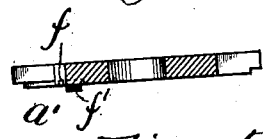
WITNESSES:
INVENTOR
Friedrich Adolf Richter
By Dickinson Brown & Raegener
ATTORNEYS No. 740,925. Patented October 6, 1903.

UNITED STATES PATENT OFFICE.

FRIEDRICH ADOLF RICHTER, OF RUDOLSTADT, GERMANY.

STAR-WHEEL FOR MUSIC-BOXES.

SPECIFICATION forming part of Letters Patent No. 740,925, dated October 6, 1903.

Application filed May 29, 1902. Serial No. 109,427. (No model.)

*To all whom it may concern:*

Be it known that I, FRIEDRICH ADOLF RICHTER, a subject of the Emperor of Germany, residing at Rudolstadt, Germany, have invented certain new and useful Improvements in Star-Wheels for Music-Boxes, of which the following is a specification.

My invention relates to star-wheels for use in connection with the comb-plates of music-boxes; and the objects of my invention are to improve the construction of such star-wheels and enable a damping effect to be obtained after a note has been sounded.

To these ends my invention consists in a star-wheel for carrying out the above objects embodying the features of construction and having the general mode of operation substantially as hereinafter fully described, and shown in the accompanying specification and drawings, in which—

Figure 1 is a face view of a star-wheel embodying my invention. Fig. 2 is a side elevation, partly in section, of portions of a music-box, showing an application of my invention. Fig. 3 is a face view of a portion of a modified form of star-wheel. Fig. 4 is an edge view of the portion of star-wheel shown in Fig. 3, and Fig. 5 is an edge view of a portion of a modification.

A designates a star-wheel, and $a$ the teeth thereof; B, a comb-plate, and $b$ the tongues of the comb-plate. It will be understood that in a music-box there is usually a star-wheel A for each tongue, and the musical tones are produced by having the teeth of the star-wheels engage with the tongues. The star-wheels are mounted upon a shaft C, which is supported at its ends in standards C'.

Each tooth $a$ of the star-wheel is provided with a damper D, here shown in this instance as consisting of a spring, which may be made from wire. One end of each spring is secured in any desired manner, as by screws $s$, to the star-wheel, while its other end is brought into such position as to be engaged by the tongue which the star-wheel actuates. It will be seen from Fig. 2 that after one tooth has engaged and actuated the tongue $b$ to cause it to vibrate the tongue will engage with the damper of the succeeding tooth before engaging with the tooth itself, and the vibration of the tongue will therefore be dampened whenever the motion of the star-wheel brings the damper into contact with the vibrating tongue. Preferably each tooth is provided with a recess $a'$, into which the free end of the damper moves when pressed back. The groove $a'$ is formed on one of the side faces of a tooth and preferably near the end thereof. Another form of groove $a^2$ is that shown in Fig. 5, extending between the side faces of the teeth. Guides are thus formed for the damper-springs.

In Fig. 3 another way of securing the springs D to the star-wheel is shown, the ends of the springs being thrust into apertures or grooves $f$ and secured therein by screws $f'$ or other suitable means.

In Fig. 5 the apertures $g$ for the ends of the springs are arranged centrally at the base of each tooth.

Without limiting myself to the construction shown and described, I claim, and desire to obtain by Letters Patent, the following:

1. A star-wheel for music-boxes having a spring-damper upon each tooth, substantially as and for the purposes set forth.

2. A star-wheel for music-boxes having a spring-damper for each tooth, and a coöperating recess for such spring-damper, substantially as and for the purposes set forth.

3. A star-wheel having a spring-damper for each tooth, and guides for guiding the movements of the dampers, substantially as and for the purposes set forth.

4. A star-wheel for music-boxes, each tooth of which is provided with a recess and a damper adapted to such recess, one end of each damper being fast to the star-wheel, substantially as and for the purposes set forth.

5. In a star-wheel for music-boxes, the combination with a tooth provided with a damper-recess, of a damper adapted to said recess and secured in position to retreat under pressure into such recess, substantially as and for the purposes set forth.

In testimony whereof I have signed my name to this specification in the presence of two subscribing witnesses.

FRIEDRICH ADOLF RICHTER.

Witnesses:
LOUIS C. JACQUES,
HERBERT G. OGDEN, Jr.